(12) United States Patent
Blinick et al.

(10) Patent No.: US 8,407,710 B2
(45) Date of Patent: Mar. 26, 2013

(54) SYSTEMS AND METHODS FOR DYNAMICALLY SCANNING A PLURALITY OF ACTIVE PORTS FOR PRIORITY SCHEDULE OF WORK

(75) Inventors: Stephen L. Blinick, Tucson, AZ (US); Steven E. Klein, Tucson, AZ (US); Daniel W. Sherman, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/904,715

(22) Filed: Oct. 14, 2010

(65) Prior Publication Data

US 2012/0096469 A1    Apr. 19, 2012

(51) Int. Cl.
G06F 9/46 (2006.01)
G06F 3/00 (2006.01)
G06F 5/00 (2006.01)
G06F 12/00 (2006.01)
G06F 13/14 (2006.01)
G06F 13/38 (2006.01)

(52) U.S. Cl. ............ 718/103; 710/41; 710/44; 710/244; 718/105

(58) Field of Classification Search ............... None
See application file for complete search history.

(56) References Cited

U.S. PATENT DOCUMENTS

| | | | |
|---|---|---|---|
| 5,875,470 A | 2/1999 | Dreibelbis et al. | |
| 6,012,151 A | 1/2000 | Mano | |
| 7,240,135 B2 | 7/2007 | Bai et al. | |
| 7,480,706 B1 | 1/2009 | Hooper et al. | |
| 7,707,344 B2 | 4/2010 | Chang et al. | |
| 2002/0039369 A1* | 4/2002 | Koo ............................... | 370/449 |
| 2003/0163595 A1* | 8/2003 | Ta et al. ......................... | 709/313 |
| 2003/0172104 A1* | 9/2003 | Hooman et al. ............... | 709/103 |
| 2005/0149933 A1* | 7/2005 | Saito et al. .................... | 718/100 |
| 2006/0195847 A1* | 8/2006 | Amano et al. ................ | 718/103 |
| 2006/0200610 A1* | 9/2006 | Yasue et al. ................... | 710/264 |
| 2007/0136730 A1* | 6/2007 | Wilt et al. ...................... | 718/102 |
| 2007/0208835 A1* | 9/2007 | Te Marvelde et al. ......... | 709/223 |
| 2008/0235696 A1* | 9/2008 | Yamamoto et al. ............ | 718/103 |
| 2009/0125602 A1* | 5/2009 | Bhatia et al. ................... | 709/207 |
| 2009/0292874 A1 | 11/2009 | Fujibayashi et al. | |
| 2010/0333100 A1* | 12/2010 | Miyazaki et al. .............. | 718/103 |
| 2011/0016247 A1* | 1/2011 | Ohmasa ......................... | 710/264 |

\* cited by examiner

*Primary Examiner* — Meng An
*Assistant Examiner* — Bradley Teets
(74) *Attorney, Agent, or Firm* — Griffiths & Seaton PLLC

(57) ABSTRACT

Systems and methods for scanning ports for work are provided. One system includes one or more processors, multiple ports, a first tracking mechanism, and a second tracking mechanism for tracking high priority work and low priority work, respectively. The processor(s) is/are configured to perform the below method. One method includes scanning the ports, finding high priority work on a port, and accepting or declining the high priority work. The method further includes changing a designation of the processor to TRUE in the first tracking mechanism if the processor accepts the high priority work such that the processor is allowed to perform the high priority work on the port. Also provided are computer storage mediums including computer code for performing the above method.

20 Claims, 6 Drawing Sheets

SYSTEMS AND METHODS FOR DYNAMICALLY SCANNING A PLURALITY OF ACTIVE PORTS FOR PRIORITY SCHEDULE OF WORK

BACKGROUND OF THE INVENTION

1. Field of the Invention

The present invention relates in general to storage systems, and particularly to, systems and methods for dynamically scanning a plurality of active ports for work.

2. Description of the Related Art

In, for example, a Fibre Channel storage device, there is a host adapter card that handles all Fibre Channel protocol interactions. It is a common practice for each adapter card to have one or more ports and some adapter cards have up to eight ports. It is also becoming a common practice to include two or more processors handling work on the adapter card.

With the added complexity of having multiple processors handling multiple ports, additional requirements are involved to maintain the integrity of port-centric data structures when performing work on a port (e.g., two processors cannot read/write to the same port-based data structures). A common practice to overcome this situation is to have a port lock allowing only one processor to process work for one port at a time. While this configuration solves the problem, this configuration also prevents the other processor from doing work for this port, which may potentially contaminate the port-centric data structures.

In addition, this configuration carries a large performance hit in two ways. First, port locks are "expensive" with respect to time, especially when a port lock is not required. Furthermore, because both processors are trying to process all of the work for the ports, there will be a lot of conflicts between the processors. Second, the processors typically spend a relatively large amount of time handling or checking if port work is available on a port that may not have any work.

One known solution is to minimize port locks by "peeking" for work first. Peeking can be done by looking at key data structures and determining if there is any work for the port. If there is work, a port lock is obtained and the work is completed. If there is no work to be done, this work is skipped. The downside to peeking is that the processors are still trying to process work for all of the ports and conflicts between processors can still occur. Also, there could be a dozen different categories of work a port has to do and peeking at each category before grabbing a port lock can be expensive and complicated to implement.

Another known solution is to create port affinity by assigning half the ports to one processor while the other half of the ports are assigned to the other processor. While this removes the possibility of the processors having port lock conflicts, it is not an acceptable solution due to the fact that port usage is dynamic. For example, if a first processor is assigned port_0 and port_1 and a second processor is assigned port_2 and port_3, this configuration works if all four ports are in use and when each processor is processing the same number of ports (e.g., the first processor is processing port_0 and the second processor is processing port_2, the first processor is processing port_0 and the second processor is processing port_3, the first processor is processing port_1 and the second processor is processing port_2, and the first processor is processing port_1 and the second processor is processing port_3). However, this configuration is inefficient when port_0 and port_1 are both being used while port_2 and port_3 are idle, or when port_2 and port_3 are both being used while port_0 and port_1 are idle because the benefit of having two processors is lost since only processor is processing work in each situation, which is unacceptable.

SUMMARY OF THE INVENTION

Various embodiments provide systems for dynamically scanning a plurality of active ports for work. One system comprises one or more processors, a plurality of ports coupled to the processor(s), a first tracking mechanism coupled to the processor(s) and configured to track low priority work for the plurality of ports with respect to a first designation of each port for each processor, and a second tracking mechanism coupled to the processor(s) and configured to track high priority work for the plurality of ports with respect to a second designation of each port for each processor. In one embodiment, the first designation for each processor is TRUE in the first tracking mechanism for each port at an initial time and the second designation for each processor is FALSE in the second tracking mechanism for each port at the initial time. Furthermore, a first processor is configured to scan the plurality of ports for high priority work, find high priority work in a port, accept or decline the high priority work, and change the second designation of the first processor to TRUE in the second tracking mechanism with respect to the port such that the first processor is allowed to perform the first high priority work on the port.

Also provided are methods for dynamically scanning a plurality of ports for work in a system comprising one or more processors, a first tracking mechanism configured to track low priority work for the plurality of ports with respect to a first designation of each port for each processor, and a second tracking mechanism configured to track high priority work for the plurality of ports with respect to a second designation of each port for each processor. One method comprises scanning, by each processor, the plurality of ports for high priority work, finding, by a processor, high priority work in a port, accepting or declining the first high priority work, and marking the second designation of the first processor as TRUE in the second tracking mechanism with respect to the port such that the processor is allowed to perform the first high priority work on the port if the processor accepts the high priority work.

Physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for dynamically scanning a plurality of ports for work in a system comprising one or more processors, a first tracking mechanism configured to track low priority work for the plurality of ports with respect to a first designation of each port for each processor, and a second tracking mechanism configured to track high priority work for the plurality of ports with respect to a second designation of each port for each processor are also provided. One physical storage medium comprises computer code for scanning, by each processor, the plurality of ports for high priority work, computer code for finding, by a processor, high priority work in a port, computer code for accepting or declining the first high priority work, and computer code for marking the second designation of the first processor as TRUE in the second tracking mechanism with respect to the port such that the processor is allowed to perform the first high priority work on the port if the processor accepts the high priority work.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for dynamically scanning a plurality of active ports for work. Also provided are physical computer storage mediums comprising computer code for dynamically scanning a plurality of active ports for work.

Figure 1:
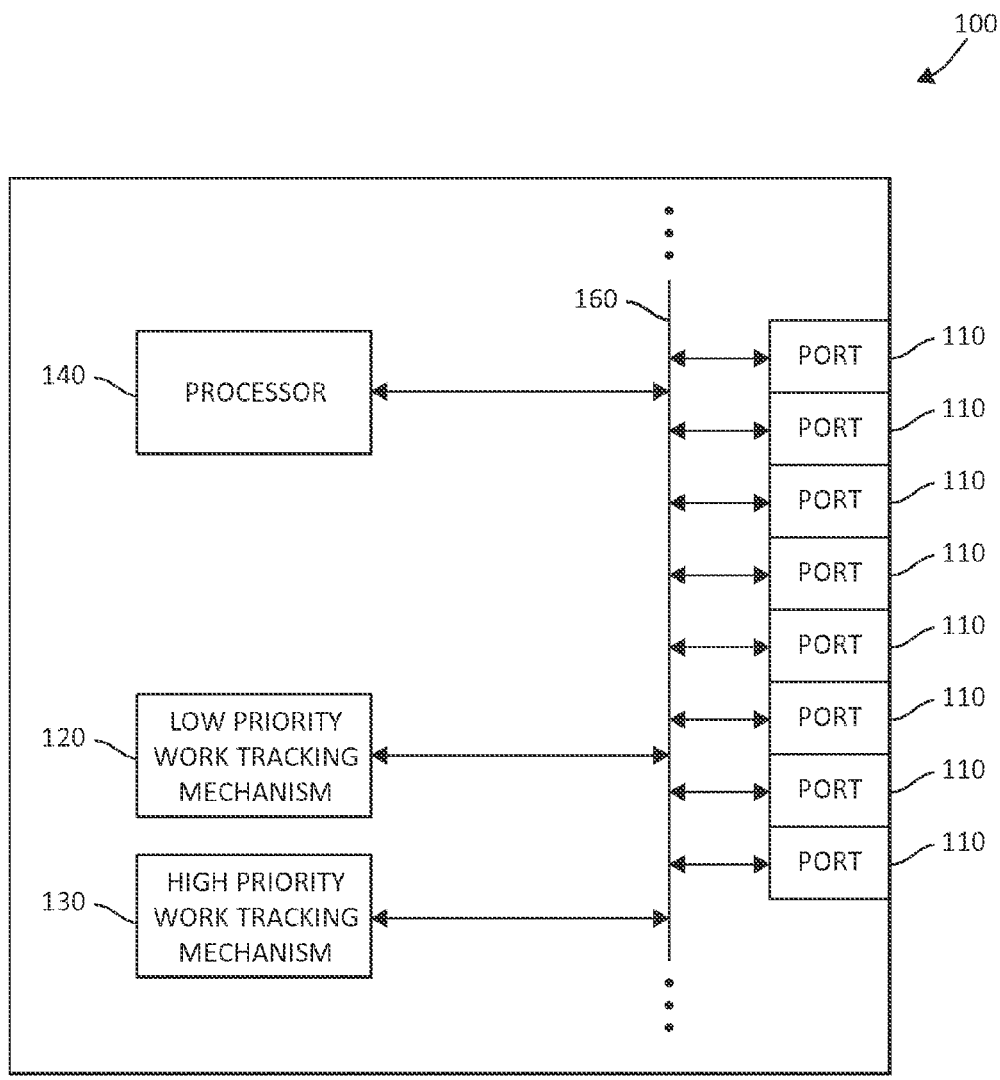
FIG. 1 is a block diagram of one embodiment of an adapter for dynamically scanning a plurality of active ports for work.

Turning now to the figures, FIG. 1 is a block diagram of one embodiment of an adapter 100 (e.g., a Fibre Channel adapter) for dynamically scanning a plurality of active ports for work. At least in the illustrated embodiment, adapter 100 comprises multiple ports 110, a low priority work tracking mechanism 120, a high priority work tracking mechanism 130, and a processor 140 coupled to one another via a bus 160 (e.g., a wired and/or wireless bus).

In the embodiment illustrated in FIG. 1, adapter 100 comprises eight ports 110. In other embodiments, adapter 100 may include more than eight ports 110 or less than eight ports 110. That is, adapter 100 may include any number of ports 110. In various embodiments, adapter 100 includes a binary number (e.g., one, two, four, eight, sixteen, thirty-two, etc.) of ports 110.

In the various embodiments, each port 110 may be any type of port known in the art or developed in the future. Furthermore, each port 110 is configured to have low priority and high priority worked performed on it by processor 140. The availability of each port 110 for work to be performed by processor 140 is tracked by low priority work tracking mechanism 120 or high priority work tracking mechanism 130.

Low priority work tracking mechanism 120 may be any tracking mechanism known in the art or developed in the future capable of tracking the availability of processor 140 to perform low priority work on each respective port 110 (discussed below). Examples of low priority work tracking mechanism 120 include, but are not limited to, one or more bitmaps, one or more tables, metadata, and/or the like tracking mechanisms.

At an initial time, in one embodiment, processor 140 is designated in low priority work tracking mechanism 120 as being allowed to perform low priority work on ports 110. For example, processor 140 is provided with a TRUE designation or status in low priority work tracking mechanism 120 for each port 110 at the initial time. If it is subsequently desirable to exclude processor 140 from performing low priority work on a particular port 110 (discussed below), processor 140 is provided with a FALSE designation or status with respect to the particular port 110 such that processor 140 is not allowed to perform low priority work on the particular port 110. When it is no longer desirable to exclude processor 140 from performing low priority work on the particular port 110 (discussed below), processor 140 is provided with the TRUE designation or status with respect to the particular port 110 such that processor 140 is allowed to perform low priority work on the particular port 110.

High priority work tracking mechanism 130 may be any tracking mechanism known in the art or developed in the future capable of tracking the availability of processor 140 to perform high priority work on each respective port 110 (discussed below). Examples of high priority work tracking mechanism 130 include, but are not limited to, one or more bitmaps, one or more tables, metadata, and/or the like tracking mechanisms.

At an initial time, in one embodiment, processor 140 is designated in high priority work tracking mechanism 130 as being excluded from performing high priority work on ports 110. For example, processor 140 is provided with a FALSE designation or status in high priority work tracking mechanism 130 for each port 110 at the initial time. If it is subsequently desirable to allow processor 140 to perform high priority work on a particular port 110 (discussed below), processor 140 is provided with a TRUE designation or status with respect to the particular port 110 such that processor 140 is allowed to perform high priority work on the particular port 110. When it is no longer desirable to allow processor 140 to perform high priority work on the particular port 110 (discussed below), processor 140 is provided with the FALSE designation or status with respect to the particular port 110 such that processor 140 is excluded from performing high priority work on the particular port 110.

Processor 140, in various embodiments, is configured to scan ports 110 for work and issue a port lock for each port 110 that processor 140 scans. When processor 140 finds low priority work, processor 140 is configured to perform the low priority work and then release the port lock.

When processor 140 finds high priority work for a particular port 110, processor 140 is configured to accept the high priority work. After processor 140 accepts the high priority work for the particular port 110, processor 140 is configured to change the designation or status of processor 140 in high priority work tracking mechanism 130 with respect to the particular port 110 to TRUE such that processor 140 is allowed to perform the high priority work for the particular port 110 on which the high priority work was found. In this situation, processor 140 includes a TRUE designation or status in both low priority work tracking mechanism 120 and high priority work tracking mechanism 130 such that processor 140 is allowed to perform both low priority work and high priority work on the particular port 110.

After processor 140 has changed the designation or status of processor 140 in high priority work tracking mechanism 130 with respect to the particular port 110, processor 140 is configured to perform the high priority work on the particular port 110. Processor 140 will maintain the designation or status of processor 140 in high priority work tracking mechanism 130 with respect to the particular port 110 for a predetermined number of scans.

After processor 140 has completed the high priority work on the particular port 110, processor 140 continues to scan the particular port 110 for additional high priority work while processor 140 includes the TRUE designation or status in high priority work tracking mechanism 130 for the particular port 110. Furthermore, while processor 140 includes the TRUE designation or status in high priority work tracking mechanism 130 for the particular port 110, processor 140 is configured to keep track or count the number of scans of the particular port 110 in which processor 140 does not find any high priority work.

If processor 140 finds high priority work on the particular port 110 within a predetermined number of scan counts while processor 140 includes the TRUE designation or status in high priority work tracking mechanism 130 for the particular port 110, processor 140 is configured to reset the count back to, for example, zero or another predetermined number and continue to scan (and count the scans) the particular port for high priority work. If processor 140 does not find high priority work on the particular port 110 within the predetermined number of scan counts while processor 140 includes the TRUE designation or status in high priority work tracking mechanism 130 for the particular storage, processor 140 is configured to release the particular port 110.

When releasing the particular port 110 after not finding high priority work on the particular port 110 within the predetermined number of scan counts, processor 140 is configured to change the designation or status of processor 140 in high priority work tracking mechanism 130 to FALSE with respect to the particular port 110 such that processor 140 is not allowed to perform high priority work on the particular port 110 until processor 140 finds and accepts high priority work on the particular port 110. Furthermore, processor 140 is configured to then release the port lock. After each port lock is released (e.g., after the predetermined number of counts has occurred or after performing low priority work), processor 140 is configured to scan the ports for work.

While the above embodiments have been discussed using the terms TRUE and/or FALSE, one skilled in the art will appreciate that other designations or status indicators may be used and the above embodiments are not limited to TRUE and/or FALSE. As such, the various embodiments discussed above may use any type of designation or status indicator that allows or excludes processor 140 from performing low priority work and high priority work on the ports 110.

Figure 2:
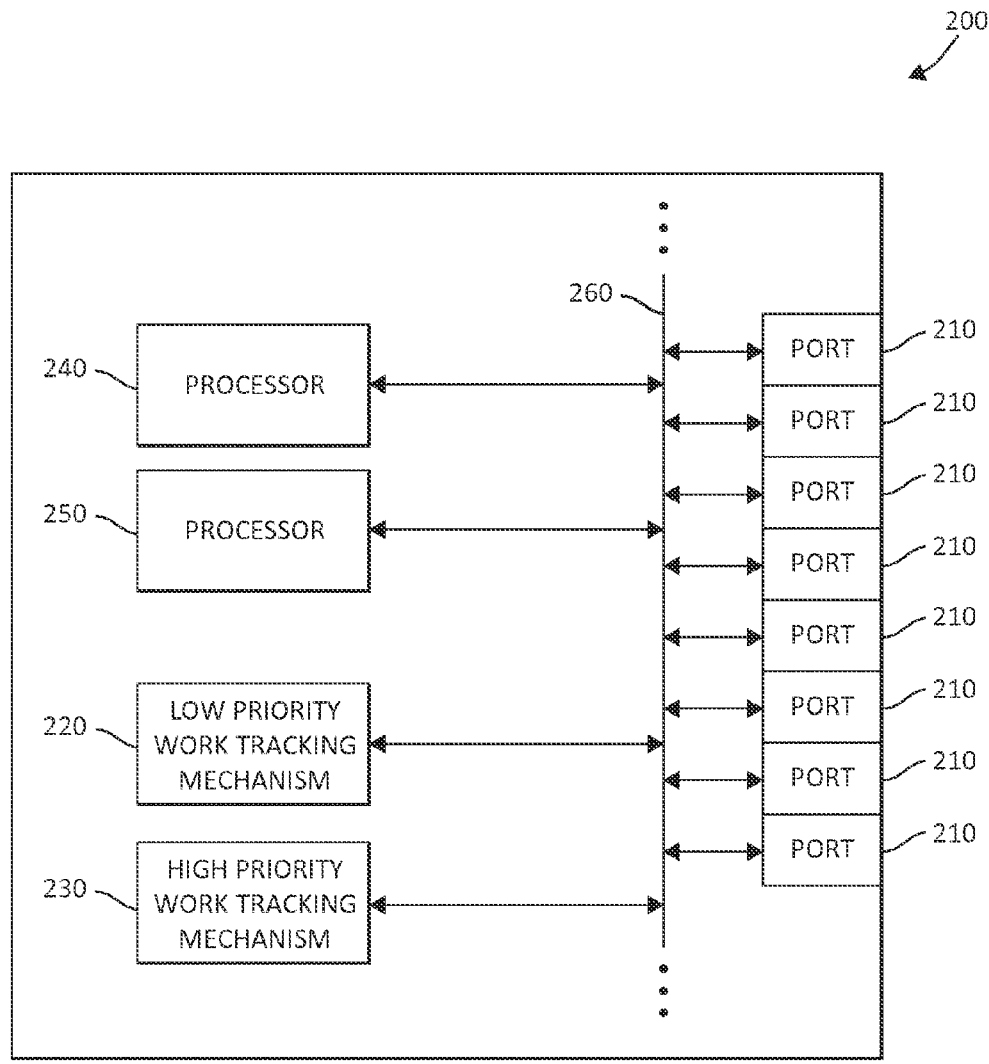
FIG. 2 is a block diagram of another embodiment of an adapter for dynamically scanning a plurality of active ports for work.

Turning now to FIG. 2, FIG. 2 is a block diagram of one embodiment of an adapter 200 (e.g., a Fibre Channel adapter) for dynamically scanning a plurality of active ports for work. At least in the illustrated embodiment, adapter 200 comprises multiple ports 210, a low priority work tracking mechanism 220, a high priority work tracking mechanism 230, a processor 240, and a processor 250 coupled to one another via a bus 260 (e.g., a wired and/or wireless bus).

In the embodiment illustrated in FIG. 2, adapter 200 comprises eight ports 210. In other embodiments, adapter 200 may include more than eight ports 210 or less than eight ports 210. That is, adapter 200 may include any number of ports 210. In various embodiments, adapter 200 includes a binary number (e.g., one, two, four, eight, sixteen, thirty-two, etc.) of ports 210.

In the various embodiments, each port 210 may be any type of port known in the art or developed in the future. Furthermore, each port 210 is configured to have low priority and high priority worked performed on it by processor 240 and processor 250. The availability of each port 210 for work to be performed by processor 240 or processor 250 is tracked by low priority work tracking mechanism 220 or high priority work tracking mechanism 230.

Low priority work tracking mechanism 220 may be any tracking mechanism known in the art or developed in the future capable of tracking the availability of processor 240 and processor 250 to perform low priority work on each respective port 210 (discussed below). Examples of low priority work tracking mechanism 220 include, but are not limited to, one or more bitmaps, one or more tables, metadata, and/or the like tracking mechanisms.

At an initial time, in one embodiment, processor 240 and processor 250 are each designated in low priority work tracking mechanism 220 as being allowed to perform low priority work on ports 210. For example, processor 240 is provided with a TRUE designation or status in low priority work tracking mechanism 220 for each port 210 at the initial time. If it is subsequently desirable to exclude processor 240 from performing low priority work on a particular port 210 (discussed below), processor 240 is provided with a FALSE designation or status with respect to the particular port 210 such that processor 240 is not allowed to perform low priority work on the particular port 210. When it is no longer desirable to exclude processor 240 from performing low priority work on the particular port 210 (discussed below), processor 240 is provided with the TRUE designation or status with respect to the particular port 210 such that processor 240 is allowed to perform low priority work on the particular port 210.

Likewise, processor 250 is provided with the TRUE designation or status in low priority work tracking mechanism 220 for each port 210 at the initial time. If it is subsequently desirable to exclude processor 250 from performing low priority work on a particular port 210 (discussed below), processor 250 is provided with a FALSE designation or status with respect to the particular port 210 such that processor 250 is not allowed to perform low priority work on the particular port 210. When it is no longer desirable to exclude processor 250 from performing low priority work on the particular port 210 (discussed below), processor 250 is provided with the TRUE designation or status with respect to the particular port 210 such that processor 250 is allowed to perform low priority work on the particular port 210.

High priority work tracking mechanism 230 may be any tracking mechanism known in the art or developed in the future capable of tracking the availability of processor 240 and processor 250 to perform high priority work on each respective port 210 (discussed below). Examples of high priority work tracking mechanism 230 include, but are not limited to, one or more bitmaps, one or more tables, metadata, and/or the like tracking mechanisms.

At an initial time, in one embodiment, processor 240 and processor 250 are each designated in high priority work tracking mechanism 230 as being excluded from performing high priority work on ports 210. For example, processor 240 is provided with a FALSE designation or status in high priority work tracking mechanism 230 for each port 210 at the initial time. If it is subsequently desirable to allow processor 240 to perform high priority work on a particular port 210 (discussed below), processor 240 is provided with a TRUE designation or status with respect to the particular port 210 such that processor 240 is allowed to perform high priority work on the particular port 210. When it is no longer desirable to allow processor 240 to perform high priority work on the particular port 210 (discussed below), processor 240 is provided with the FALSE designation or status with respect to the particular port 210 such that processor 240 is excluded from performing high priority work on the particular port 210.

Likewise, processor 250 is provided with the FALSE designation or status in high priority work tracking mechanism 230 for each port 210 at the initial time. If it is subsequently desirable to allow processor 250 to perform high priority work on a particular port 210 (discussed below), processor 250 is provided with the TRUE designation or status with respect to the particular port 210 such that processor 250 is allowed to perform high priority work on the particular port 210. When it is no longer desirable to allow processor 250 to perform high priority work on the particular port 210 (discussed below), processor 250 is provided with the FALSE designation or status with respect to the particular port 210 such that processor 250 is excluded from performing high priority work on the particular port 210.

Processor 240, in various embodiments, is configured to scan ports 210 for work and issue a port lock for each port 210 that processor 240 scans. When processor 240 finds low priority work, processor 240 is configured to perform the low priority work and then release the port lock. When processor 240 finds high priority work for a particular port 210, processor 240 is configured to then determine whether to accept or decline the high priority work based on predetermined criteria.

In various embodiments, the predetermined criteria are based on the number of TRUE designations in high priority work tracking mechanism 230 for each of processor 240 and processor 250. In one embodiment, processor 240 is configured to determine and compare the number of TRUE designations that processor 240 and processor 250 have in high priority tracking mechanism 230. Processor 240 is configured to then decline high priority work for a port 210 if processor 240 includes a greater number of TRUE designations in high priority work tracking mechanism 230 than processor 250 such that processor 250 will find and perform the high priority work when processor 250 scans the particular port. When processor 240 declines the high priority work, processor 240 is configured to release the port lock for the particular port 210.

Processor 240 is further configured to accept high priority work for the port 210 if processor 240 includes the same number or a smaller number of TRUE designations in high priority work tracking mechanism 230 than processor 250. When processor 240 accepts the high priority work for the particular port 210, processor 240 is configured to change the designation or status of processor 250 in low priority work tracking mechanism 220 with respect to the particular port 210 to FALSE such that processor 250 is not allowed to perform low priority work for the particular port 210 on which the high priority work was found. In addition, processor 240 is configured to change the designation or status of processor 240 in high priority work tracking mechanism 230 with respect to the particular port 210 to TRUE such that processor 240 is allowed to perform the high priority work for the particular port 210 on which the high priority work was found.

In this situation, processor 240 includes a TRUE designation or status in both low priority work tracking mechanism 220 and high priority work tracking mechanism 230 such that processor 240 is allowed to perform both low priority work and high priority work on the particular port 210. Furthermore, processor 250 includes a FALSE designation or status in both low priority work tracking mechanism 220 and high priority work tracking mechanism 230 such that processor 250 is not allowed to perform either low priority work or high priority work on the particular port 210.

After processor 240 has changed the designation or status of processor 250 in low priority work tracking mechanism 220 and the status of processor 240 in high priority work tracking mechanism 230 with respect to the particular port 210, processor 240 is configured to perform the high priority work on the particular port 210. Processor 240 will maintain the designation or status of processor 250 in low priority work tracking mechanism 220 and the status of processor 240 in high priority work tracking mechanism 230 with respect to the particular port 210 for a predetermined number of scans.

After processor 240 has completed the high priority work on the particular port 210, processor 240 continues to scan the particular port 210 for additional high priority work while processor 240 includes the TRUE designation or status in high priority work tracking mechanism 230 for the particular port 210. Furthermore, while processor 240 includes the TRUE designation or status in high priority work tracking mechanism 230 for the particular port 210, processor 240 is configured to keep track or count the number of scans of the particular port 210 in which processor 240 does not find any high priority work.

If processor 240 finds high priority work on the particular port 210 within a predetermined number of scan counts while processor 240 includes the TRUE designation or status in high priority work tracking mechanism 230 for the particular port 210, processor 240 is configured to reset the count back to, for example, zero or another predetermined number and continue to scan (and count the scans) the particular port for high priority work. If processor 240 does not find high priority work on the particular port 210 within the predetermined number of scan counts while processor 240 includes the TRUE designation or status in high priority work tracking mechanism 230 for the particular storage, processor 240 is configured to release the particular port 210.

When releasing the particular port 210 after not finding high priority work on the particular port 210 within the predetermined number of scan counts, processor 240 is configured to change the designation or status of processor 240 in high priority work tracking mechanism 230 to FALSE with respect to the particular port 210 such that processor 240 is not allowed to perform high priority work on the particular port 210 until processor 240 finds and accepts high priority work on the particular port 210. In addition, processor 240 is further configured to change the designation or status of processor 250 in low priority work tracking mechanism 220 to TRUE with respect to the particular port 210 such that processor 250 is allowed to perform low priority work on the particular port 210. Processor 140 is configured to then release the port lock and, after each port lock is released (e.g., after the predetermined number of counts has occurred or after performing low priority work), processor 240 is configured to scan the ports for work.

Processor 250, in various embodiments, is configured to scan ports 210 for work and issue a port lock for each port 210 that processor 250 scans. When processor 250 finds low priority work, processor 250 is configured to perform the low priority work and then release the port lock. When processor 250 finds high priority work for a particular port 210, processor 250 is configured to then determine whether to accept or decline the high priority work based on predetermined criteria.

In various embodiments, the predetermined criteria are based on the number of TRUE designations in high priority work tracking mechanism 230 for each of processor 250 and processor 240. In one embodiment, processor 250 is configured to determine and compare the number of TRUE designations that processor 250 and processor 240 have in high priority tracking mechanism 230. Processor 250 is configured to then decline high priority work for a port 210 if processor 250 includes a greater number of TRUE designations in high priority work tracking mechanism 230 than processor 240 such that processor 240 will find and perform the high priority work when processor 240 scans the particular port. When processor 250 declines the high priority work, processor 250 is configured to release the port lock for the particular port 210.

Processor 250 is further configured to accept high priority work for the port 210 if processor 250 includes the same number or a smaller number of TRUE designations in high priority work tracking mechanism 230 than processor 240. When processor 250 accepts the high priority work for the particular port 210, processor 250 is configured to change the designation or status of processor 240 in low priority work tracking mechanism 220 with respect to the particular port 210 to FALSE such that processor 240 is not allowed to perform low priority work for the particular port 210 on which the high priority work was found. In addition, processor 250 is configured to change the designation or status of processor 250 in high priority work tracking mechanism 230 with respect to the particular port 210 to TRUE such that processor 250 is allowed to perform the high priority work for the particular port 210 on which the high priority work was found.

In this situation, processor 250 includes a TRUE designation or status in both low priority work tracking mechanism 220 and high priority work tracking mechanism 230 such that processor 250 is allowed to perform both low priority work and high priority work on the particular port 210. Furthermore, processor 240 includes a FALSE designation or status in both low priority work tracking mechanism 220 and high priority work tracking mechanism 230 such that processor 240 is not allowed to perform either low priority work or high priority work on the particular port 210.

After processor 250 has changed the designation or status of processor 240 in low priority work tracking mechanism 220 and the status of processor 250 in high priority work tracking mechanism 230 with respect to the particular port 210, processor 250 is configured to perform the high priority work on the particular port 210. Processor 250 will maintain the designation or status of processor 240 in low priority work tracking mechanism 220 and the status of processor 250 in high priority work tracking mechanism 230 with respect to the particular port 210 for a predetermined number of scans.

After processor 250 has completed the high priority work on the particular port 210, processor 250 continues to scan the particular port 210 for additional high priority work while processor 250 includes the TRUE designation or status in high priority work tracking mechanism 230 for the particular port 210. Furthermore, while processor 250 includes the TRUE designation or status in high priority work tracking mechanism 230 for the particular port 210, processor 250 is configured to keep track or count the number of scans of the particular port 210 in which processor 250 does not find any high priority work.

If processor 250 finds high priority work on the particular port 210 within a predetermined number of scan counts while processor 250 includes the TRUE designation or status in high priority work tracking mechanism 230 for the particular port 210, processor 250 is configured to reset the count back to, for example, zero or another predetermined number. If processor 250 does not find high priority work on the particular port 210 within the predetermined number of scan counts while processor 250 includes the TRUE designation or status in high priority work tracking mechanism 230 for the particular storage, processor 250 is configured to release the particular port 210.

When releasing the particular port 210 after not finding high priority work on the particular port 210 within the predetermined number of scan counts, processor 250 is configured to change the designation or status of processor 250 in high priority work tracking mechanism 230 to FALSE with respect to the particular port 210 such that processor 250 is not allowed to perform high priority work on the particular port 210 until processor 250 finds and accepts high priority work on the particular port 210. In addition, processor 250 is further configured to change the designation or status of processor 240 in low priority work tracking mechanism 220 to TRUE with respect to the particular port 210 such that processor 240 is allowed to perform low priority work on the particular port 210. Processor 250 is configured to then release the port lock and, after each port lock is released (e.g., after the predetermined number of counts has occurred or after performing low priority work), processor 250 is configured to scan the ports for work.

While the above embodiments have been discussed using the terms TRUE and/or FALSE, one skilled in the art will appreciate that other designations or status indicators may be used and the above embodiments are not limited to TRUE and/or FALSE. As such, the various embodiments discussed above may use any type of designation or status indicator that allows or excludes processors 240, 250 from performing low priority work and high priority work on the ports 210.

Although FIG. 2 illustrates various embodiments of adapter 200 as comprising processors 240 and 250, adapter 200 is not limited to two processors. That is, in various other embodiments, adapter 200 comprises more than two processors.

Figure 3:
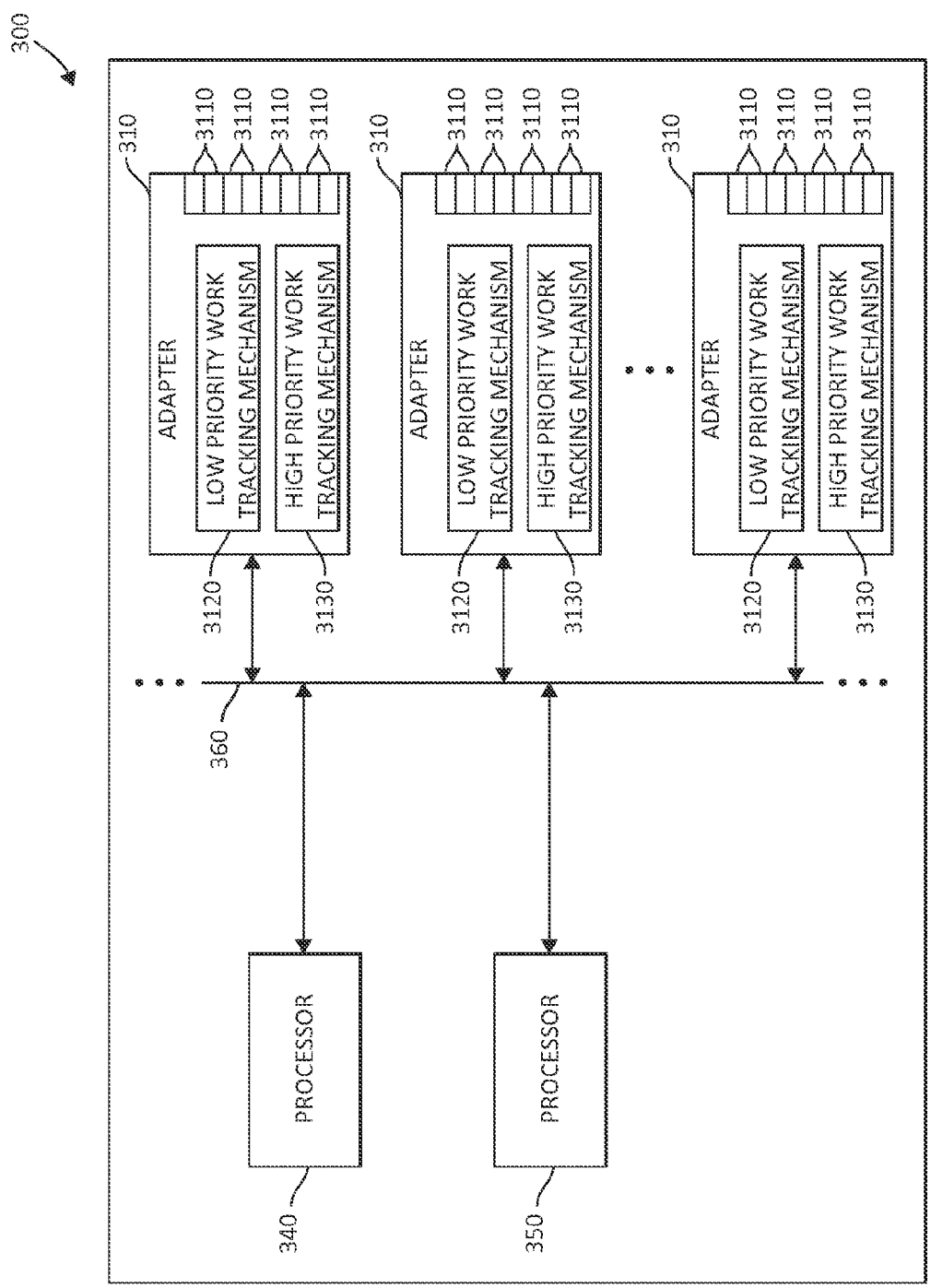
FIG. 3 is a block diagram of one embodiment of a system for dynamically scanning a plurality of active ports for work.

Turning now to FIG. 3, FIG. 3 is a block diagram of one embodiment of a system 300 for dynamically scanning a plurality of active ports for work. At least in the illustrated embodiment, system 300 comprises multiple adapters 310 (e.g., Fibre Channel adapters), a processor 340, and a processor 350 coupled to one another via a bus 360 (e.g., a wired and/or wireless bus). Each adapter 310 comprises multiple ports 3110, a low priority work tracking mechanism 3120 and a high priority work tracking mechanism 3130.

In the embodiment illustrated in FIG. 3, system 300 comprises three adapters 310. In other embodiments, system 300 may include more than three adapters 310 or less than three adapters 310. That is, system 300 may include any number of adapters 310. In various embodiments, system 300 includes a binary number (e.g., one, two, four, eight, sixteen, thirty-two, etc.) of adapters 310.

As additionally illustrated in FIG. 3, each adapter 310 comprises eight ports 3110. In other embodiments, each adapter 310 may include more than eight ports 3110 or less than eight ports 3110. That is, each adapter 310 may include any number of ports 3110. In various embodiments, each adapter 310 includes a binary number (e.g., one, two, four, eight, sixteen, thirty-two, etc.) of ports 3110.

In the various embodiments, each port 3110 may be any type of port known in the art or developed in the future. Furthermore, each port 3110 is configured to have low priority and high priority worked performed on it by processor 340 and processor 350. The availability of each port 3110 for work to be performed by processor 340 or processor 350 is tracked by low priority work tracking mechanism 3120 or high priority work tracking mechanism 3130.

Low priority work tracking mechanism 3120 may be any tracking mechanism known in the art or developed in the future capable of tracking the availability of processor 340 and processor 350 to perform low priority work on each respective port 3110 (discussed below). Examples of low priority work tracking mechanism 3120 include, but are not limited to, one or more bitmaps, one or more tables, metadata, and/or the like tracking mechanisms.

At an initial time, in one embodiment, processor 340 and processor 350 are each designated in low priority work tracking mechanism 3120 as being allowed to perform low priority work on ports 3110. For example, processor 340 is provided with a TRUE designation or status in low priority work tracking mechanism 3120 for each port 3110 at the initial time. If it is subsequently desirable to exclude processor 340 from performing low priority work on a particular port 3110 (discussed below), processor 340 is provided with a FALSE designation or status with respect to the particular port 3110 such that processor 340 is not allowed to perform low priority work on the particular port 3110. When it is no longer desirable to exclude processor 340 from performing low priority work on the particular port 3110 (discussed below), processor 340 is provided with the TRUE designation or status with respect to the particular port 3110 such that processor 340 is allowed to perform low priority work on the particular port 3110.

Likewise, processor 350 is provided with the TRUE designation or status in low priority work tracking mechanism 3120 for each port 3110 at the initial time. If it is subsequently desirable to exclude processor 350 from performing low priority work on a particular port 3110 (discussed below), processor 350 is provided with a FALSE designation or status with respect to the particular port 3110 such that processor 350 is not allowed to perform low priority work on the particular port 3110. When it is no longer desirable to exclude processor 350 from performing low priority work on the particular port 3110 (discussed below), processor 350 is provided with the TRUE designation or status with respect to the particular port 3110 such that processor 350 is allowed to perform low priority work on the particular port 3110.

High priority work tracking mechanism 3130 may be any tracking mechanism known in the art or developed in the future capable of tracking the availability of processor 340 and processor 350 to perform high priority work on each respective port 3110 (discussed below). Examples of high priority work tracking mechanism 3130 include, but are not limited to, one or more bitmaps, one or more tables, metadata, and/or the like tracking mechanisms.

At an initial time, in one embodiment, processor 340 and processor 350 are each designated in high priority work tracking mechanism 3130 as being excluded from performing high priority work on ports 3110. For example, processor 340 is provided with a FALSE designation or status in high priority work tracking mechanism 3130 for each port 3110 at the initial time. If it is subsequently desirable to allow processor 340 to perform high priority work on a particular port 3110 (discussed below), processor 340 is provided with a TRUE designation or status with respect to the particular port 3110 such that processor 340 is allowed to perform high priority work on the particular port 3110. When it is no longer desirable to allow processor 340 to perform high priority work on the particular port 3110 (discussed below), processor 340 is provided with the FALSE designation or status with respect to the particular port 3110 such that processor 340 is excluded from performing high priority work on the particular port 3110.

Likewise, processor 350 is provided with the FALSE designation or status in low priority work tracking mechanism 3120 for each port 3110 at the initial time. If it is subsequently desirable to allow processor 350 to perform high priority work on a particular port 3110 (discussed below), processor 350 is provided with the TRUE designation or status with respect to the particular port 3110 such that processor 350 is allowed to perform high priority work on the particular port 3110. When it is no longer desirable to allow processor 350 to perform high priority work on the particular port 3110 (discussed below), processor 350 is provided with the FALSE designation or status with respect to the particular port 3110 such that processor 350 is excluded from performing high priority work on the particular port 3110.

Processor 340, in various embodiments, is configured to scan ports 3110 for work and issue a port lock for each port 3110 that processor 340 scans. When processor 340 finds low priority work, processor 340 is configured to perform the low priority work and then release the port lock. When processor 340 finds high priority work for a particular port 3110, processor 340 is configured to then determine whether to accept or decline the high priority work based on predetermined criteria.

In various embodiments, the predetermined criteria are based on the number of TRUE designations in high priority work tracking mechanism 3130 for each of processor 340 and processor 350. In one embodiment, processor 340 is configured to determine and compare the number of TRUE designations that processor 340 and processor 350 have in high priority tracking mechanism 3130. Processor 340 is configured to then decline high priority work for a port 3110 if processor 340 includes a greater number of TRUE designations in high priority work tracking mechanism 3130 than processor 350 such that processor 350 will find and perform the high priority work when processor 350 scans the particular port. When processor 340 declines the high priority work, processor 340 is configured to release the port lock for the particular port 3110.

Processor 340 is further configured to accept high priority work for the port 3110 if processor 340 includes the same number or a smaller number of TRUE designations in high priority work tracking mechanism 3130 than processor 350. When processor 340 accepts the high priority work for the particular port 3110, processor 340 is configured to change the designation or status of processor 350 in low priority work tracking mechanism 3120 with respect to the particular port 3110 to FALSE such that processor 350 is not allowed to perform low priority work for the particular port 3110 on which the high priority work was found. In addition, processor 340 is configured to change the designation or status of processor 340 in high priority work tracking mechanism 3130 with respect to the particular port 3110 to TRUE such that processor 340 is allowed to perform the high priority work for the particular port 3110 on which the high priority work was found.

In this situation, processor 340 includes a TRUE designation or status in both low priority work tracking mechanism 3120 and high priority work tracking mechanism 3130 such that processor 340 is allowed to perform both low priority work and high priority work on the particular port 3110. Furthermore, processor 350 includes a FALSE designation or status in both low priority work tracking mechanism 3120 and high priority work tracking mechanism 3130 such that processor 350 is not allowed to perform either low priority work or high priority work on the particular port 3110.

After processor 340 has changed the designation or status of processor 350 in low priority work tracking mechanism 3120 and the status of processor 340 in high priority work tracking mechanism 3130 with respect to the particular port 3110, processor 340 is configured to perform the high priority work on the particular port 3110. Processor 340 will maintain the designation or status of processor 350 in low priority work tracking mechanism 3120 and the status of processor 340 in high priority work tracking mechanism 3130 with respect to the particular port 3110 for a predetermined number of scans.

After processor 340 has completed the high priority work on the particular port 3110, processor 340 continues to scan the particular port 3110 for additional high priority work while processor 340 includes the TRUE designation or status in high priority work tracking mechanism 3130 for the particular port 3110. Furthermore, while processor 340 includes the TRUE designation or status in high priority work tracking mechanism 3130 for the particular port 3110, processor 340 is configured to keep track or count the number of scans of the particular port 3110 in which processor 340 does not find any high priority work.

If processor 340 finds high priority work on the particular port 3110 within a predetermined number of scan counts while processor 340 includes the TRUE designation or status in high priority work tracking mechanism 3130 for the particular port 3110, processor 340 is configured to reset the count back to, for example, zero or another predetermined number and continue to scan (and count the scans) the particular port for high priority work. If processor 340 does not find high priority work on the particular port 3110 within the predetermined number of scan counts while processor 340 includes the TRUE designation or status in high priority work tracking mechanism 3130 for the particular storage, processor 340 is configured to release the particular port 3110.

When releasing the particular port 3110 after not finding high priority work on the particular port 3110 within the predetermined number of scan counts, processor 340 is configured to change the designation or status of processor 340 in high priority work tracking mechanism 3130 to FALSE with respect to the particular port 3110 such that processor 340 is not allowed to perform high priority work on the particular port 3110 until processor 340 finds and accepts high priority work on the particular port 3110. In addition, processor 340 is further configured to change the designation or status of processor 350 in low priority work tracking mechanism 3120 to TRUE with respect to the particular port 3110 such that processor 350 is allowed to perform low priority work on the particular port 3110. Processor 340 is configured to then release the port lock and, after each port lock is released (e.g., after the predetermined number of counts has occurred or after performing low priority work), processor 340 is configured to scan the ports for work.

Processor 350, in various embodiments, is configured to scan ports 3110 for work and issue a port lock for each port 3110 that processor 350 scans. When processor 350 finds low priority work, processor 350 is configured to perform the low priority work and then release the port lock.

When processor 350 finds high priority work for a particular port 3110, processor 350 is configured to then determine whether to accept or decline the high priority work based on predetermined criteria. In various embodiments, the predetermined criteria are based on the number of TRUE designations in high priority work tracking mechanism 3130 for each of processor 350 and processor 340. In one embodiment, processor 350 is configured to determine and compare the number of TRUE designations that processor 350 and processor 340 have in high priority tracking mechanism 3130. Processor 350 is configured to then decline high priority work for a port 3110 if processor 350 includes a greater number of TRUE designations in high priority work tracking mechanism 3130 than processor 340 such that processor 340 will find and perform the high priority work when processor 340 scans the particular port. When processor 350 declines the high priority work, processor 350 is configured to release the port lock for the particular port 3110.

Processor 350 is further configured to accept high priority work for the port 3110 if processor 350 includes the same number or a smaller number of TRUE designations in high priority work tracking mechanism 3130 than processor 340. When processor 350 accepts the high priority work for the particular port 3110, processor 350 is configured to change the designation or status of processor 340 in low priority work tracking mechanism 3120 with respect to the particular port 3110 to FALSE such that processor 340 is not allowed to perform low priority work for the particular port 3110 on which the high priority work was found. In addition, processor 350 is configured to change the designation or status of processor 350 in high priority work tracking mechanism 3130 with respect to the particular port 3110 to TRUE such that processor 350 is allowed to perform the high priority work for the particular port 3110 on which the high priority work was found.

In this situation, processor 350 includes a TRUE designation or status in both low priority work tracking mechanism 3120 and high priority work tracking mechanism 3130 such that processor 350 is allowed to perform both low priority work and high priority work on the particular port 3110. Furthermore, processor 340 includes a FALSE designation or status in both low priority work tracking mechanism 3120 and high priority work tracking mechanism 3130 such that processor 340 is not allowed to perform either low priority work or high priority work on the particular port 3110.

After processor 350 has changed the designation or status of processor 340 in low priority work tracking mechanism 3120 and the status of processor 350 in high priority work tracking mechanism 3130 with respect to the particular port 3110, processor 350 is configured to perform the high priority work on the particular port 3110. Processor 350 will maintain the designation or status of processor 340 in low priority work tracking mechanism 3120 and the status of processor 350 in high priority work tracking mechanism 3130 with respect to the particular port 3110 for a predetermined number of scans.

After processor 350 has completed the high priority work on the particular port 3110, processor 350 continues to scan the particular port 3110 for additional high priority work while processor 350 includes the TRUE designation or status in high priority work tracking mechanism 3130 for the particular port 3110. Furthermore, while processor 350 includes the TRUE designation or status in high priority work tracking mechanism 3130 for the particular port 3110, processor 350 is configured to keep track or count the number of scans of the particular port 3110 in which processor 350 does not find any high priority work.

If processor 350 finds high priority work on the particular port 3110 within a predetermined number of scan counts while processor 350 includes the TRUE designation or status in high priority work tracking mechanism 3130 for the particular port 3110, processor 350 is configured to reset the count back to, for example, zero or another predetermined number. If processor 350 does not find high priority work on the particular port 3110 within the predetermined number of scan counts while processor 350 includes the TRUE designation or status in high priority work tracking mechanism 3130 for the particular storage, processor 350 is configured to release the particular port 3110.

When releasing the particular port 3110 after not finding high priority work on the particular port 3110 within the predetermined number of scan counts, processor 350 is configured to change the designation or status of processor 350 in high priority work tracking mechanism 3130 to FALSE with respect to the particular port 3110 such that processor 350 is not allowed to perform high priority work on the particular port 3110 until processor 350 finds and accepts high priority work on the particular port 3110. In addition, processor 350 is further configured to change the designation or status of processor 340 in low priority work tracking mechanism 3120 to TRUE with respect to the particular port 3110 such that processor 340 is allowed to perform low priority work on the particular port 3110. Processor 350 is configured to then release the port lock and, after each port lock is released (e.g., after the predetermined number of counts has occurred or after performing low priority work), processor 350 is configured to scan the ports for work.

While the above embodiments have been discussed using the terms TRUE and/or FALSE, one skilled in the art will appreciate that other designations or status indicators may be used and the above embodiments are not limited to TRUE and/or FALSE. As such, the various embodiments discussed above may use any type of designation or status indicator that allows or excludes processors 340, 350 from performing low priority work and high priority work on the ports 3110.

Although FIG. 3 illustrates various embodiments of system 300 as comprising processors 340 and 350, system 300 is not limited to two processors. That is, in various other embodiments, system 300 comprises more than two processors.

Figure 4:
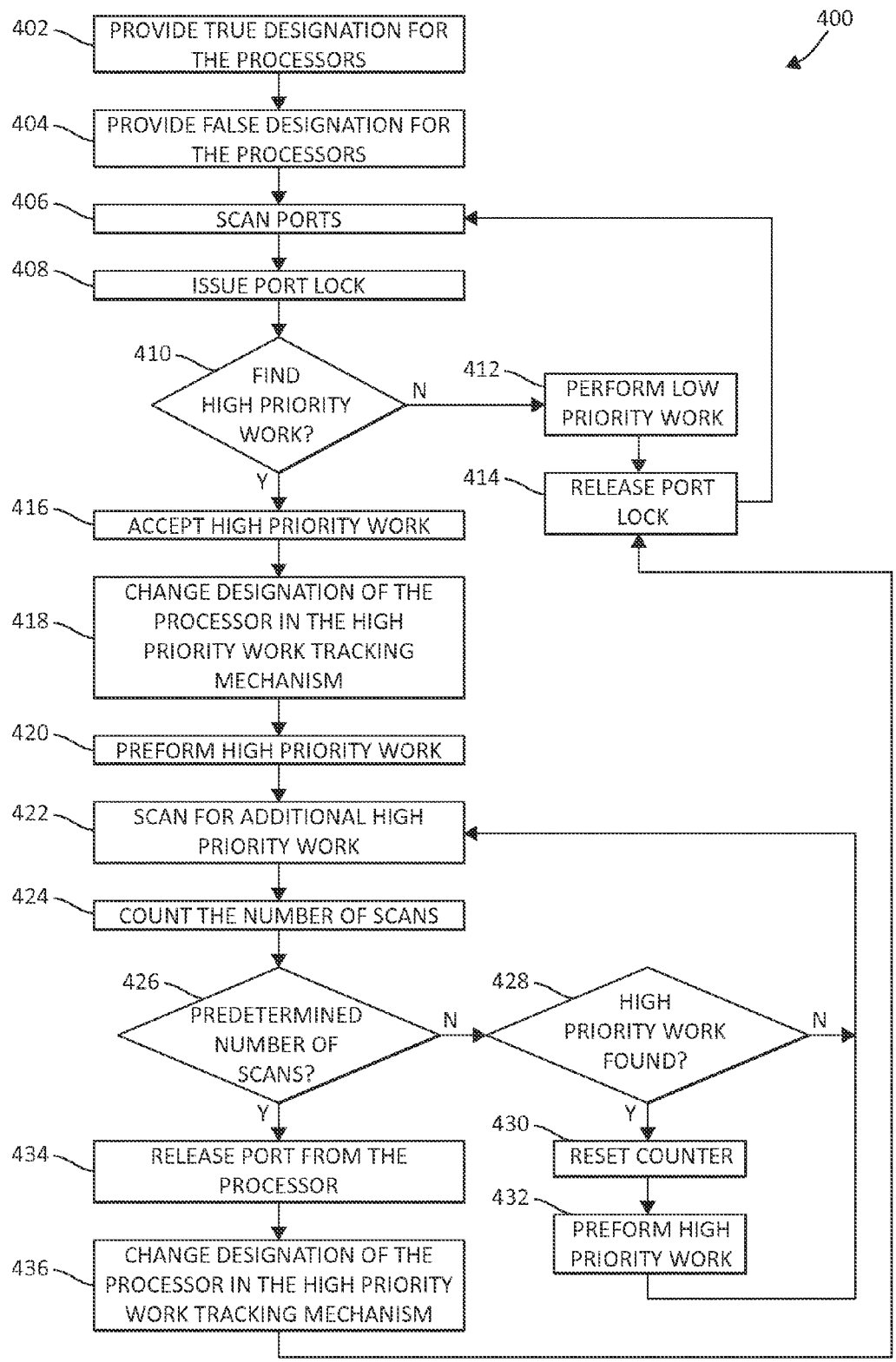
FIG. 4 is a flow diagram of one embodiment of a method for dynamically scanning a plurality of active ports for work.

Turning now to FIG. 4, FIG. 4 is a flow diagram of one embodiment of a method 400 for dynamically scanning a plurality of active ports for work. At least in the illustrated embodiment, method 400 begins by providing a TRUE designation or status for a processor (e.g., processor 140) in a low priority work tracking mechanism (e.g., low priority tracking mechanism 120) (block 402) and providing a FALSE designation or status for the processor in a high priority work tracking mechanism (e.g., high priority tracking mechanism 130) (block 404).

Method 400 continues by scanning multiple ports (e.g., ports 110) for work (block 406). When work is found on a particular port, method 400 issues a port lock (block 408) and determines if the work is high priority work (block 410). If the work is not high priority work (i.e., is low priority work), method 400 includes performing the low priority work (block 412) and releasing the port lock (block 414).

If the work is high priority work, method 400 includes accepting the high priority work (block 416). Method 400 further includes changing the designation or status of the processor in the high priority work tracking mechanism with respect to the particular port to TRUE (block 418) such that the processor is allowed to perform the high priority work and low priority for the particular port on which the high priority work was found.

After the designation or status of the processor in the high priority work tracking mechanism has been changed with respect to the particular port, method 400 includes performing the high priority work on the particular port (block 420). In one embodiment, the designation or status of the processor in the high priority work tracking mechanism is maintained with respect to the particular port for a predetermined number of scans.

After the high priority work on the particular port has been completed, method 400 includes scanning the particular port for additional high priority work (block 422) while the processor includes the TRUE designation or status in the high priority work tracking mechanism for the particular port. Furthermore, while the processor includes the TRUE designation or status in the high priority work tracking mechanism for the particular port, method 400 includes tracking or counting the number of scans of the particular port in which the present processor does not find any high priority work on the particular port (block 424).

Method 400 then determines if a predetermined number of scans has occurred without finding high priority work on the particular port (block 426). If the predetermined number of scans has not occurred, method 400 includes determining if additional high priority work is found on the particular port (block 428). If additional work is not found, method 400 includes continuing to scan the particular port for additional high priority work (block 422). If additional work is found, method 400 includes resetting the count back to, for example, zero or another predetermined number (block 430), performing the additional high priority work (block 432), and continuing to scan the particular port for additional high priority work (block 422).

If the predetermined number of scans has occurred at block 426, method 400 includes releasing the particular port from the present processor (block 434). When releasing the particular port after not finding high priority work on the particular port within the predetermined number of scan counts, method 400 includes changing the designation or status of the processor in the high priority work tracking mechanism to FALSE with respect to the particular port (block 436) such that the processor is not allowed to perform high priority work on the particular port until the processor finds and accepts high priority work on the particular port. The port lock is then released (block 414) and method 400 returns to scanning the multiple ports for work after each port lock is released (block 406).

Figure 5A:
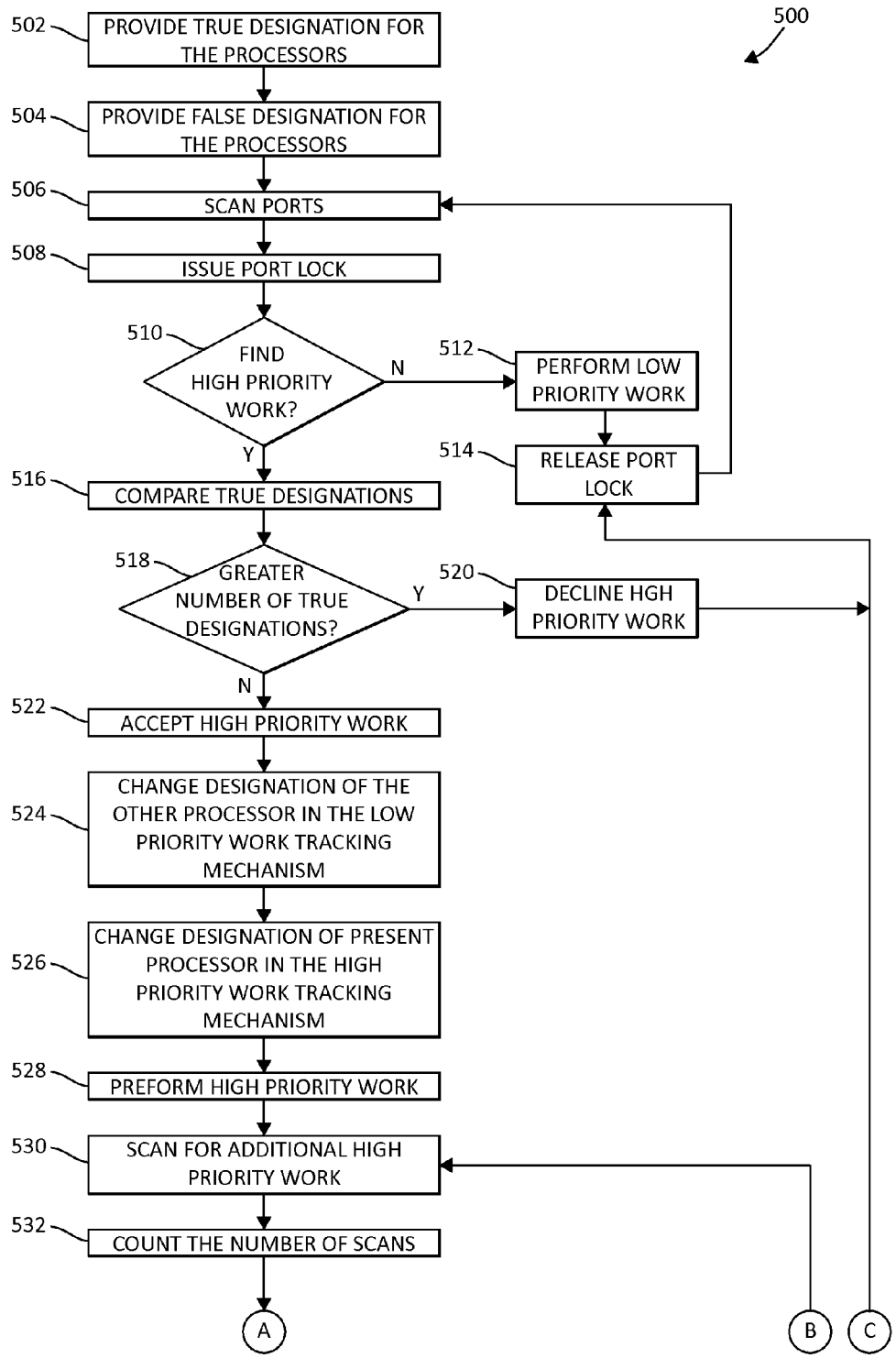
FIGS. 5A and 5B are a flow diagram of another embodiment of a method for dynamically scanning a plurality of active ports for work.
Figure 5B:
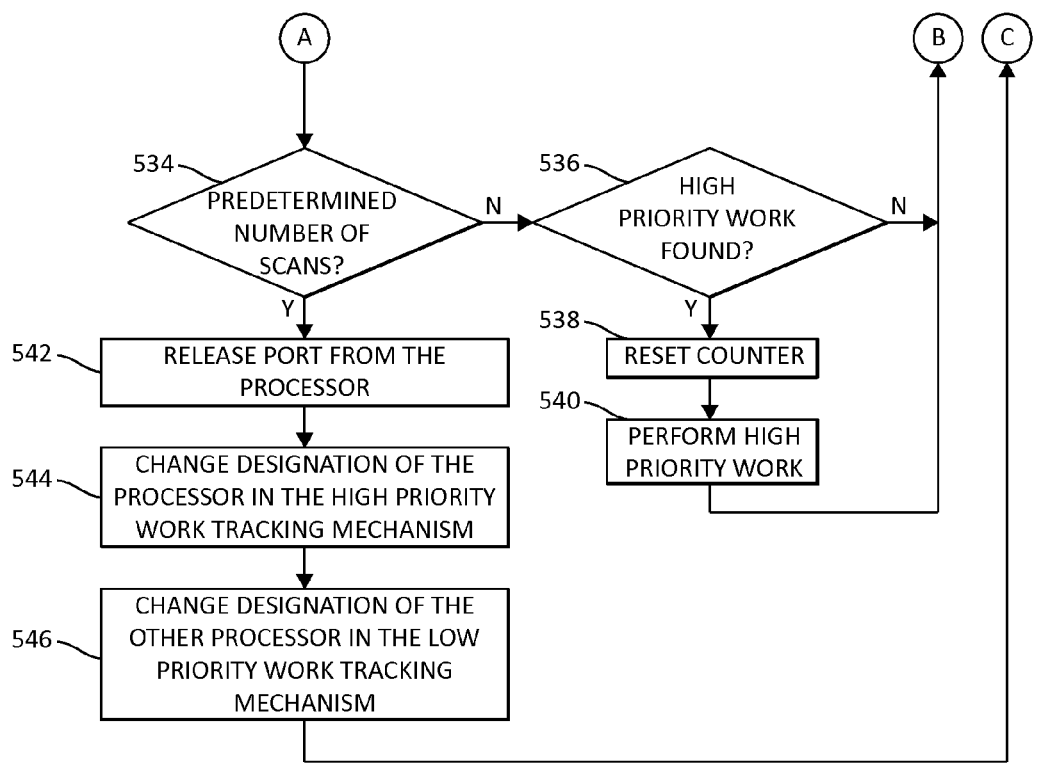

Turning now to FIGS. 5A and 5B, a flow diagram of one embodiment of a method 500 for dynamically scanning a plurality of active ports for work is provided. At least in the illustrated embodiment, method 500 begins by providing a TRUE designation or status for each of a first processor (e.g., processor 140 or processor 240) and a second processor (e.g., processor 250) in a low priority work tracking mechanism (e.g., low priority tracking mechanism 120 or low priority work tracking mechanism 2120) (block 502) and providing a FALSE designation or status for each of the first processor and the second processor in a high priority work tracking mechanism (e.g., high priority tracking mechanism 130 or high priority work tracking mechanism 2130) (block 504)

Method 500 continues by scanning multiple ports (e.g., ports 110 or ports 2110) for work (block 506). When work is found on a particular port, method 500 issues a port lock (block 508) and determines if the work is high priority work (block 510). If the work is not high priority work (i.e., is low priority work), method 500 includes performing the low priority work (block 512) and releasing the port lock (block 514).

If the work is high priority work, method 500 includes comparing, by the processor that found the high priority work, the number of TRUE designations that the first processor and the second processor have in the high priority tracking mechanism (block 516). Method 500 further includes determining if the processor that found the high priority work (hereafter, "the present processor") includes a greater number of TRUE designations in the high priority work tracking mechanism than a processor that did not find the high priority work (hereafter, "the other processor") (block 518).

If the present processor includes a greater number of TRUE designations in the high priority work tracking mechanism than the other processor, method 500 includes declining the high priority work (block 520) and releasing the port lock (block 514). If the present processor does not include a greater number of TRUE designations in the high priority work tracking mechanism than the other processor (i.e., the present processor includes the same number or a smaller number of TRUE designations in the high priority work tracking mechanism than the other processor), method 500 includes accepting the high priority work (block 522).

After the high priority work for the particular port is accepted by the present processor, method 500 includes changing the designation or status of the other processor in the low priority work tracking mechanism with respect to the particular port to FALSE (block 524) such that the other processor is not allowed to perform work for the particular port on which the high priority work was found. Method 500 further includes changing the designation or status of the present processor in the high priority work tracking mechanism with respect to the particular port to TRUE (block 526) such that the present processor is allowed to perform the high priority work and low priority for the particular port on which the high priority work was found.

In this situation, the present processor includes a TRUE designation or status in both the low priority work tracking mechanism and the high priority work tracking mechanism and the present processor is allowed to perform both low priority work and high priority work on the particular port. Furthermore, the other processor includes a FALSE designation or status in both the low priority work tracking mechanism and the high priority work tracking mechanism and the other processor is not allowed to perform either low priority work or high priority work on the particular port.

After the designation or status of the other processor in the low priority work tracking mechanism and the status of the present processor in the high priority work tracking mechanism has been changed with respect to the particular port, method 500 includes performing the high priority work on the particular port (block 528). The designation or status of the other processor in the low priority work tracking mechanism and the status of the present processor in the high priority work tracking mechanism is maintained with respect to the particular port for a predetermined number of scans.

After the high priority work on the particular port has been completed, method 500 includes scanning the particular port for additional high priority work (block 530) while the present processor includes the TRUE designation or status in the high priority work tracking mechanism for the particular port. Furthermore, while the present processor includes the TRUE designation or status in the high priority work tracking mechanism for the particular port, method 500 includes tracking or counting the number of scans of the particular port in which the present processor does not find any high priority work on the particular port (block 532).

Method 500 then determines if a predetermined number of scans has occurred without finding high priority work on the particular port (block 534). If the predetermined number of scans has not occurred, method 500 includes determining if additional high priority work is found on the particular port (block 536). If additional work is not found, method 500 includes continuing to scan the particular port for additional high priority work (block 530). If additional work is found, method 500 includes resetting the count back to, for example, zero or another predetermined number (block 538), performing the additional high priority work (block 540), and continuing to scan the particular port for additional high priority work (block 530).

If the predetermined number of scans has occurred at block 534, method 500 includes releasing the particular port from the present processor (block 542). When releasing the particular port after not finding high priority work on the particular port within the predetermined number of scan counts, method 500 includes changing the designation or status of the present processor in the high priority work tracking mechanism to FALSE with respect to the particular port (block 544) such that the present processor is not allowed to perform high priority work on the particular port until the present processor finds and accepts high priority work on the particular port. In addition, method 500 includes changing the designation or status of the other processor in the low priority work tracking mechanism to TRUE with respect to the particular port (block 546) such that the other processor is allowed to perform low priority work on the particular port. The port lock is released (block 514) and method 500 then returns to scanning the multiple ports for work after each port lock is released (block 506).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for scanning a plurality of active ports for works, comprising:
   the plurality of ports configured for receiving a high priority work and a low priority work;
   a first processor and a second processor each in communication with each of the plurality of ports and configured to scan the plurality of ports for the high priority work and the low priority work; and
   tracking mechanisms in communication with each port of the plurality of ports, the first processor, and the second processor, the tracking mechanisms configured to track an availability of the first processor and the second processor to perform the high priority work or the low priority work on each port of the plurality of ports,
   wherein:
   the availability of the first processor and the second processor to perform the high priority work or the low priority work on a corresponding port of the plurality of ports is indicated by a TRUE designation representing availability or a FALSE designation representing unavailability by the tracking mechanisms,
   at an initial time instance, the tracking mechanisms set the availability of both the first processor and the second processor to the TRUE designation for accepting low priority work from each port of the plurality of ports and to the FALSE designation for accepting high priority work from each port of the plurality of ports,
   the first processor and the second processor are each configured to issue a port lock for each port of the plurality of ports that the first processor or the second processor scans,
   when the first processor identifies and accepts high priority work from the one port of the plurality of ports, the tracking mechanisms change the availability of the first processor to accept high priority work from the one port of the plurality of ports to the TRUE designation, if accepted, or maintain the availability of the first processor to accept high priority work from the one port of the plurality of ports at the FALSE designation, if declined, and
   if the first processor declines acceptance of high priority work from the one port of the plurality of ports, the second processor accepts the high priority work from the one port, and the tracking mechanisms change the availability of the second processor from the one port of the plurality of ports accepting the high priority work to the TRUE designation.

2. The system of claim 1, wherein the first processor and the second processor are each configured to perform the low priority work at a corresponding port if a scan identifies low priority work and to release the port lock of the corresponding port after the low priority work is completed.

3. The system of claim 1, wherein:
   the first processor is configured to accept the high priority work from the one port of the plurality of ports, if the tracking mechanisms indicate a total number of TRUE designations of the plurality of ports to accept high priority work associated with the first processor is less than or equal to a total number of TRUE designations of the plurality of ports to accept high priority work associated with the second processor, and
   the first processor is configured to decline the high priority work from the one port of the plurality of ports, if the tracking mechanisms indicate the total number of TRUE designations of the plurality of ports to accept high priority work associated with the first processor is greater than the total number of TRUE designations of the plurality of ports to accept high priority work associated with the second processor.

4. The system of claim 3, wherein the tracking mechanisms are further configured to designate the availability of the first processor to accept low priority work from the one port of the plurality of ports as the FALSE designation such that the first processor is not allowed to accept the low priority work from the one port of the plurality of ports, when the first processor is allowed to accept the high priority work from the one port of the plurality of ports.

5. The system of claim 3, wherein the tracking mechanisms are further configured to designate the availability of the first processor to accept low priority work from the one port of the plurality of ports at the TRUE designation such that the first processor is allowed to accept both the high priority work and the low priority work from the one port of the plurality of ports.

6. The system of claim 5, wherein the tracking mechanisms are further configured to designate the availability of the second processor to accept high priority work from the one port of the plurality of ports as the FALSE designation so that the second processor is not allowed to accept high priority work from the one port of the plurality of ports.

7. The system of claim 1, wherein after the first processor declines acceptance of high priority work from an other port of the plurality of ports and the second processor accepts the high priority work from the other port, the tracking mechanisms change the availability of the second processor to accept high priority work from the other port of the plurality of ports to the TRUE designation.

8. The system of claim 1, wherein the first processor and the second processor are each configured to:
    scan the one port of the plurality of ports or other ports of the plurality of ports for additional high priority work;
    track a number of scans performed on the one port or the other ports of the plurality of ports;
    release the one port or the other port of the plurality of ports, if the number of scans performed exceeds a predetermined number of scans, where to release the one or the other ports, the tracking mechanisms change the availability of the first processor to accept high priority work to the FALSE designation and the availability of the first processor to accept low priority work to the TRUE designation or change the availability of the second processor to accept high priority work to the FALSE designation and the availability of the second processor to accept low priority work to the TRUE designation; and
    reset the number of scans for the one port or the other ports of the plurality of ports when the additional high priority work is found and the number of scans is less than the predetermined number of scans.

9. A method for scanning a plurality of active ports for work, comprising:
    scanning the plurality of ports for a high priority work and a low priority work with a first processor and a second processor each in communication with each of the plurality of ports and configured to be capable of performing the high priority work and the low priority work and to issue a port lock on each scanned port;
    tracking via tracking mechanisms in communication with each of the plurality of ports, the first processor, and the second processor an availability of the first processor and the second processor to perform the high priority work or the low priority work on each port of the plurality of ports, wherein the availability of the first processor and the second processor to perform the high priority work or the low priority work on a corresponding port of the plurality of ports is indicated by a TRUE designation representing availability or a FALSE designation representing unavailability by the tracking mechanisms;
    at an initial time instance, setting the availability of both the first processor and the second processor to the TRUE designation for accepting low priority work from each of the plurality of ports and the FALSE designation for accepting high priority work from each of the plurality of ports;
    accepting high priority work from the one port of the plurality of ports to be performed by the first processor and changing the availability of the first processor to accept high priority work from the one port of the plurality of ports to the TRUE designation, if accepted, or maintaining the availability of the first processor to accept high priority work from the one port of the plurality of ports at the FALSE designation, if declined; and
    accepting the high priority work from the one port to be performed by the second processor and changing the availability of the second processor from the one port of the plurality of ports accepting high priority work to the TRUE designation, if the first processor declines acceptance of high priority work from the one port of the plurality of ports.

10. The method of claim 9, further comprising
    accepting the high priority work from the one port of the plurality of ports to be performed by the first processor, if a total number of TRUE designations of the plurality of ports to accept high priority work associated with the first processor is less than or equal to a total number of TRUE designations of the plurality of ports to accept high priority work associated with the second processor, and
    declining the high priority work from the one port of the plurality of ports to be performed by the first processor, if the total number of TRUE designations of the plurality of ports to accept high priority work associated with the first processor is greater than the total number of TRUE designations of the plurality of ports to accept high priority work associated with the second processor.

11. The method of claim 10, further comprising designating the availability of the first processor to accept low priority work from the one port of the plurality of ports as the FALSE designation such that the first processor is not allowed to accept the low priority work from the one port of the plurality of ports, when the first process is allowed to accept the high priority work from the one port of the plurality of ports.

12. The method of claim 10, further comprising designating the availability of the first processor to accept low priority work from the one port of the plurality of ports at the TRUE designation such that the first processor is allowed to accept both the high priority work and the low priority work from the one port of the plurality of ports.

13. The method of claim 12, further comprising designating the availability of the second processor to accept high priority work from the one port of the plurality of ports to the FALSE designation so that the second processor is not allowed to accept high priority work from the one port of the plurality of ports.

14. The method of claim 9, further comprising wherein after the first processor declines acceptance of high priority work from an other port of the plurality of ports and the second processor accepts the high priority work from the other port, changing the availability of the second processor to accept high priority work from the other port of the plurality of ports to the TRUE designation.

15. A non-transitory computer storage medium storing a computer program when executed by a processor to perform a method for scanning a plurality of active ports for work in a system including a first processor and a second processor each in operable communication with each port of the plurality of ports and each configured to be capable of performing high priority work and low priority work on each of the plurality of ports, and tracking mechanisms in communication with each port of the plurality of ports, the first processor, and the second processor, the computer program comprising:

computer code for scanning the plurality of ports for the high priority work and the low priority work and issuing a port lock on each scanned port;

computer code for tracking an availability of the first processor and the second processor to perform the high priority work or the low priority work on each port of the plurality of ports, wherein the availability of the first processor and the second processor to perform the high priority work or the low priority work on a corresponding port of the plurality of ports is indicated by a TRUE designation representing availability or a FALSE designation representing unavailability by the tracking mechanisms;

computer code for, at an initial time instance, setting the availability of both the first processor and the second processor to the TRUE designation for accepting low priority work from each of the plurality of ports and the FALSE designation for accepting high priority work from each of the plurality of ports;

computer code for accepting high priority work from the one port of the plurality of ports to be performed by the first processor and changing the availability of the first processor to accept high priority work from the one port of the plurality of ports to the TRUE designation, if accepted, or maintaining the availability of the first processor to accept high priority work from the one port of the plurality of ports at the FALSE designation, if declined;

and computer code for accepting the high priority work from the one port to be performed by the second processor and changing the availability of the second processor from the one port of the plurality of ports accepting high priority work to the TRUE designation, if the first processor declines acceptance of high priority work from the one port of the plurality of ports.

16. The non-transitory computer storage medium of claim 15, further comprising: computer code for accepting the high priority work from the one port of the plurality of ports to be performed by the first processor, if a total number of TRUE designations of the plurality of ports to accept high priority work associated with the first processor is less than or equal to a total number of TRUE designations of the plurality of ports to accept high priority work associated with the second processor, and computer code for declining the high priority work from the one port of the plurality of ports to be performed by the first processor, if the total number of TRUE designations of the plurality of ports to accept high priority work associated with the first processor is greater than the total number of TRUE designations of the plurality of ports to accept high priority work associated with the second processor.

17. The non-transitory computer storage medium of claim 16, further comprising computer code for designating the availability of the first processor to accept low priority work from the one port of the plurality of ports as the FALSE designation such that the first processor is not allowed to accept the low priority work from the one port of the plurality of ports, when the first processor is allowed to accept the high priority work from the one port of the plurality of ports.

18. The non-transitory computer storage medium of claim 16, further comprising computer code for designating the availability of the first processor to accept low priority work from the one port of the plurality of ports at the TRUE designation such that the first processor is allowed to accept both the high priority work and the low priority work from the one port of the plurality of ports.

19. The non-transitory computer storage medium of claim 16, further comprising computer code for designating the availability of the second processor to accept high priority work from the one port of the plurality of ports to the FALSE designation so that the second processor is not allowed to accept the high priority work from the one port of the plurality of ports.

20. The non-transitory computer storage medium of claim 15, further comprising computer code for wherein after the first processor declines acceptance of high priority work from an other port of the plurality of ports and the second processor accepts the high priority work from the other port, changing the availability of the second processor to accept the high priority work from the other port of the plurality of ports to the TRUE designation.

* * * * *